United States Patent
Kishore et al.

(10) Patent No.: US 8,732,349 B2
(45) Date of Patent: May 20, 2014

(54) ASSIGNMENT OF RESOURCES IN AN INPUT/OUTPUT (I/O) VIRTUALIZATION SYSTEM

(75) Inventors: Karagada R. Kishore, Saratoga, CA (US); Kiron Malwankar, Saratoga, CA (US); Peter E. Kirkpatrick, San Francisco, CA (US)

(73) Assignee: Fusion-Io, Inc., Salt Lake City, UT (US)

( * ) Notice: Subject to any disclaimer, the term of this patent is extended or adjusted under 35 U.S.C. 154(b) by 0 days.

(21) Appl. No.: 12/790,921

(22) Filed: May 31, 2010

(65) Prior Publication Data

US 2011/0119423 A1 May 19, 2011

Related U.S. Application Data

(63) Continuation-in-part of application No. 12/751,543, filed on Mar. 31, 2010, now Pat. No. 8,412,860.

(60) Provisional application No. 61/262,416, filed on Nov. 18, 2009.

(51) Int. Cl.
*G06F 3/00* (2006.01)
*G06F 13/40* (2006.01)

(52) U.S. Cl.
CPC .................................. *G06F 13/4022* (2013.01)
USPC .......................................................... 710/20

(58) Field of Classification Search
CPC ................... G06F 13/4022; G06F 2213/0058; G06F 13/10; G06F 13/4004; H04L 29/06; H04L 67/34
USPC .......................................................... 710/36
See application file for complete search history.

(56) References Cited

U.S. PATENT DOCUMENTS

| | | | |
|---|---|---|---|
| 6,748,478 B1 * | 6/2004 | Burke et al. | 710/312 |
| 6,895,588 B1 * | 5/2005 | Ruberg | 719/321 |
| 7,188,209 B2 | 3/2007 | Pettey et al. | |
| 7,327,748 B2 | 2/2008 | Montalvo et al. | |
| 7,492,723 B2 | 2/2009 | Boyd et al. | |
| 7,506,094 B2 * | 3/2009 | Boyd et al. | 710/316 |
| 7,529,860 B2 | 5/2009 | Freimuth et al. | |
| 7,633,955 B1 | 12/2009 | Saraiya et al. | |
| 7,752,376 B1 | 7/2010 | Johnsen et al. | |
| 2004/0003141 A1 | 1/2004 | Matters et al. | |
| 2006/0195620 A1 | 8/2006 | Arndt et al. | |
| 2006/0212606 A1 | 9/2006 | Arndt et al. | |

(Continued)

OTHER PUBLICATIONS

International Search Report and Written Opinion in Application No. PCT/US2010/045730 dated Nov. 15, 2010, 3 pages.

(Continued)

*Primary Examiner* — Ernest Unelus
*Assistant Examiner* — Ronald Modo
(74) *Attorney, Agent, or Firm* — Meyertons, Hood, Kivlin, Kowert & Goetzel, P.C.

(57) ABSTRACT

An Input/Output (IO) Virtualization (IOV) system provides a mechanism for sharing computer peripheral devices or resources between multiple host computers by presenting a single resource multiple times to numerous host systems. The IOV system provides IO virtualization and host-to-host communication services to the host computers. The system comprises device interfaces coupled to the IO devices. Each IO device comprises at least one endpoint function (EPF). Host interfaces are each coupled to one of a number of host computers. Each host interface includes a proxy, and each proxy comprises configuration data.

24 Claims, 6 Drawing Sheets

(56) References Cited

U.S. PATENT DOCUMENTS

| | | |
|---|---|---|
| 2006/0230181 A1 | 10/2006 | Riley |
| 2006/0242330 A1* | 10/2006 | Torudbakken et al. ............ 710/5 |
| 2006/0242352 A1* | 10/2006 | Torudbakken et al. ....... 710/312 |
| 2007/0094378 A1 | 4/2007 | Baldwin et al. |
| 2008/0126648 A1 | 5/2008 | Brownlow et al. |
| 2008/0195756 A1 | 8/2008 | Galles |
| 2008/0222338 A1 | 9/2008 | Balasubramanian et al. |
| 2008/0270599 A1 | 10/2008 | Tamir et al. |
| 2008/0288644 A1 | 11/2008 | Gilfix et al. |
| 2008/0288661 A1 | 11/2008 | Galles |
| 2008/0288664 A1 | 11/2008 | Pettey et al. |
| 2009/0157979 A1 | 6/2009 | Gregg et al. |
| 2009/0248947 A1 | 10/2009 | Malwankar et al. |
| 2010/0115174 A1 | 5/2010 | Akyol et al. |
| 2011/0029695 A1 | 2/2011 | Kishore et al. |
| 2011/0106981 A1 | 5/2011 | Watkins et al. |

OTHER PUBLICATIONS

European Search Report in Application No. 10810470.4 dated Jan. 7, 2013, 8 pages.

2380.2.86, PAPRS.P017, U.S. Appl. No. 12/751,543, Office Action, Feb. 7, 2012.

2380.2.86, PAPRS.P017, U.S. Appl. No. 12/751,543, Office Action, Jul. 20, 2011.

2380.2.86pct, APRS.P017WO, Application No. PCT/US2010/029433, International Preliminary Report on Patentability, Jun. 2, 2010.

2380.2.86pct, APRS.P017WO, Application No. PCT/US2010/029433, International Search Report and Written Opinion, Jun. 2, 2010.

Cox, Menon A., "Optimizing Network Virtualization in Xen", USENIX 2006 Annual Technical Conference, May 30-Jun. 3, 2006, Boston, Massachusetts, US, http://www.cs.uiowa.edu/-gjordans/Papers/xen-net-opt.pdf.

Virtensys, "Virtensys First to Deliver PCI Express-Based I/O Virtualization Switches to Customers", Feb. 23, 2009, http://www.virtensys.com/news-events-pr-pr_20080600_Virtensys-Demonstrates-PCI-Express-Based-IO-Virtualization.php.

2380.2.74, PAPRS.P025, U.S. Appl. No. 12/790,920, Office Action, May 1, 2012.

2380.2.74, PAPRS.P025, U.S. Appl. No. 12/790,920, Office Action, Sep. 4, 2012.

2380.2.74, PAPRS. P025, U.S. Appl. No. 12/790,920, Notice of Allowance, Dec. 19, 2012.

2380.2.74, APRS.P025, U.S. Appl. No. 12/790,920, Office Action, Sep. 30, 2011.

* cited by examiner

ASSIGNMENT OF RESOURCES IN AN INPUT/OUTPUT (I/O) VIRTUALIZATION SYSTEM

RELATED APPLICATIONS

This application claims the benefit of U.S. Patent Application No. 61/262,416, filed Nov. 18, 2009.

This application is a continuation in part of U.S. patent application Ser. No. 12/751,543, filed Mar. 31, 2010.

This application is related to U.S. patent application Ser. No. 12/265,695, filed Nov. 5, 2008.

This application is related to U.S. patent application Ser. No. 12/353,659, filed Jan. 14, 2009.

TECHNICAL FIELD

The disclosure herein relates generally to network architectures.

BACKGROUND

Conventional technologies include a standard known as single-root input/output virtualization (SR-IOV) for PCI Express® (PCIe) devices. The SR-IOV allows multiple operating systems running simultaneously within a single computer to natively share PCIe devices by providing native input/output (IO or I/O) virtualization in PCIe topologies where there is a single root complex. The single root complex typically indicates a central processing complex with a single chipset, where the PCIe root complex resides. Therefore, SR-IOV allows multiple guest operating systems running in a virtual machine environment on a single processing complex to access multiple functions in a SR-IOV capable device.

Multi-root IOV (MR-IOV) has also been specified, which builds on SR-IOV to provide native I/O virtualization in topologies in which multiple root complexes share a PCIe hierarchy. The MR-IOV, however, requires implementation at the fabric, endpoint, and system levels that has not been realized to date.

Additionally, conventional technologies include proprietary systems that have been developed to implement IO virtualization. However, these systems do not provide native, transparent PCIe connections to the hosts and IO devices in the system and, further, require proprietary IO resource modules or drivers to run on the hosts.

Fiber Channel over Ethernet (FCoE) is another conventional technology that allows for tunneling storage traffic using a Fiber Channel protocol to be encapsulated in ethernet frames and transported on an ethernet fabric. However, extensive infrastructure replacement will be necessary to implement FCoE, like required replacement of the switching fabric, IO devices, and drivers associated with the client-server (ethernet) and storage (fiber channel) networks.

Conventional systems also include ExpressEther, which is a system architecture that provides a mechanism to transport PCIe traffic over an ethernet fabric. However, the system does not provide sharing of PCIe devices at the function level, but only serial assignment of an entire device to a given host. Moreover, the system does not provide for a centralized management entity.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

An Input/Output (IO) Virtualization (IOV) system is described herein that provides a mechanism for sharing computer peripheral devices or resources between multiple host computers. This sharing of a single device across multiple host systems is referred to as "Input/Output Virtualization" because a single resource is presented multiple times to numerous host systems. The IOV system, in coupling or connecting multiple host computers and multiple IO devices to a managed transport fabric, provides IO virtualization services to the host computers. The host computers may be of any type or size, and may run any operating system or hypervisor to provide a virtualized environment for guest operating systems. The host interface to the IOV system is PCI-Express (PCIe), which is available on nearly every modern computer, particularly server class machines. The IO devices are PCIe based to provide maximum compatibility with industry standard devices, but are not so limited.

In the following description, numerous specific details are introduced to provide a thorough understanding of, and enabling description for, embodiments of the present invention. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1A:
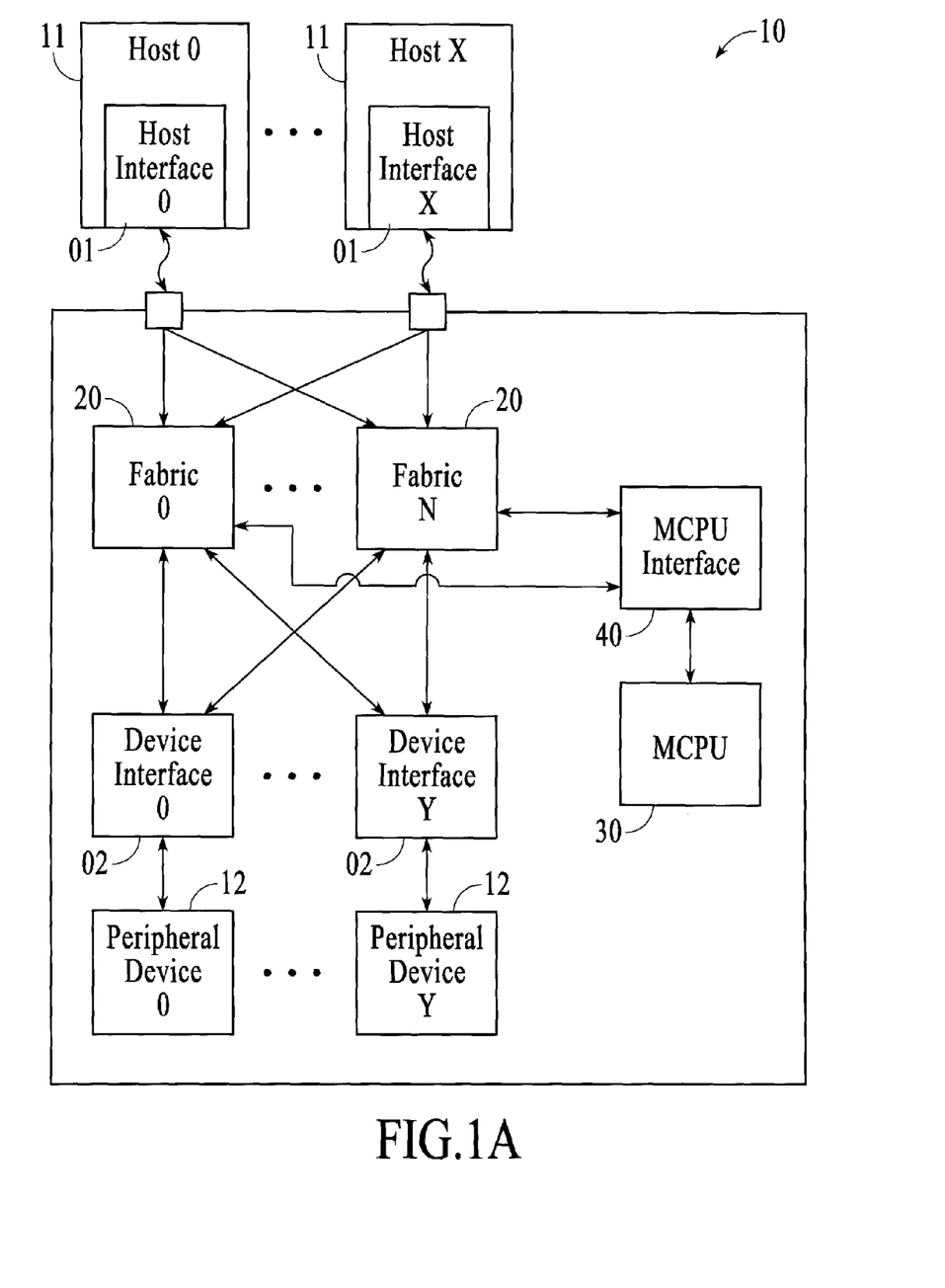
FIG. 1A is a block diagram of the Input/Output Virtualization (IOV) System, under an embodiment.

FIG. 1A is a block diagram of the Input/Output Virtualization (IOV) System 10, under an embodiment. The IOV system 10 comprises a number of IOV interface devices 01-02. The IOV interface devices of an embodiment include host interface devices 01 coupled or connected to host computers 11, where at least one host interface device 01 is coupled or connected to at least one host computer 11 (e.g., Host Interface 0 coupled or connected to Host 0 (Computer), Host Interface X coupled or connected to Host X (Computer), where X is any number). The IOV interface devices of an embodiment also include endpoint interface devices 02 coupled or connected to IO devices 12, where at least one endpoint interface device 02 is coupled or connected to at least one IO device 12 (e.g., Device Interface 0 coupled or connected to Peripheral Device 0, Device Interface Y coupled or connected to Peripheral Device Y (where Y is any number)). Host computer interfaces 01 and device interfaces 02 are in the form of high-speed digital logic devices such as FPGA or ASIC devices, but are not so limited.

The IOV system further includes a transport fabric 20. The transport fabric 20 is a scalable, low-latency, high-bandwidth interconnection fabric that couples or connects the host computers 11, the IO devices 12, and the IOV interface devices 01-02 to the system. A management CPU (MCPU) 30 of an embodiment couples or connects to the transport fabric 20 via an interface referred to herein as the MCPU interface 40. The MCPU interface can also be an FPGA or ASIC device(s) and/or implemented in software, but the embodiment is not so limited.

The IOV system provides, generally, that peripheral resources 12 are initialized in the PCIe domain of the MCPU 30 and then exposed or made available across the fabric 20 to the hosts 11 in their respective PCIe domains. The MCPU 30 maintains privileged control over the resources 12 (entire device and global resources) while exposing a subset of control (function level) to the host 11.

Figure 1B:
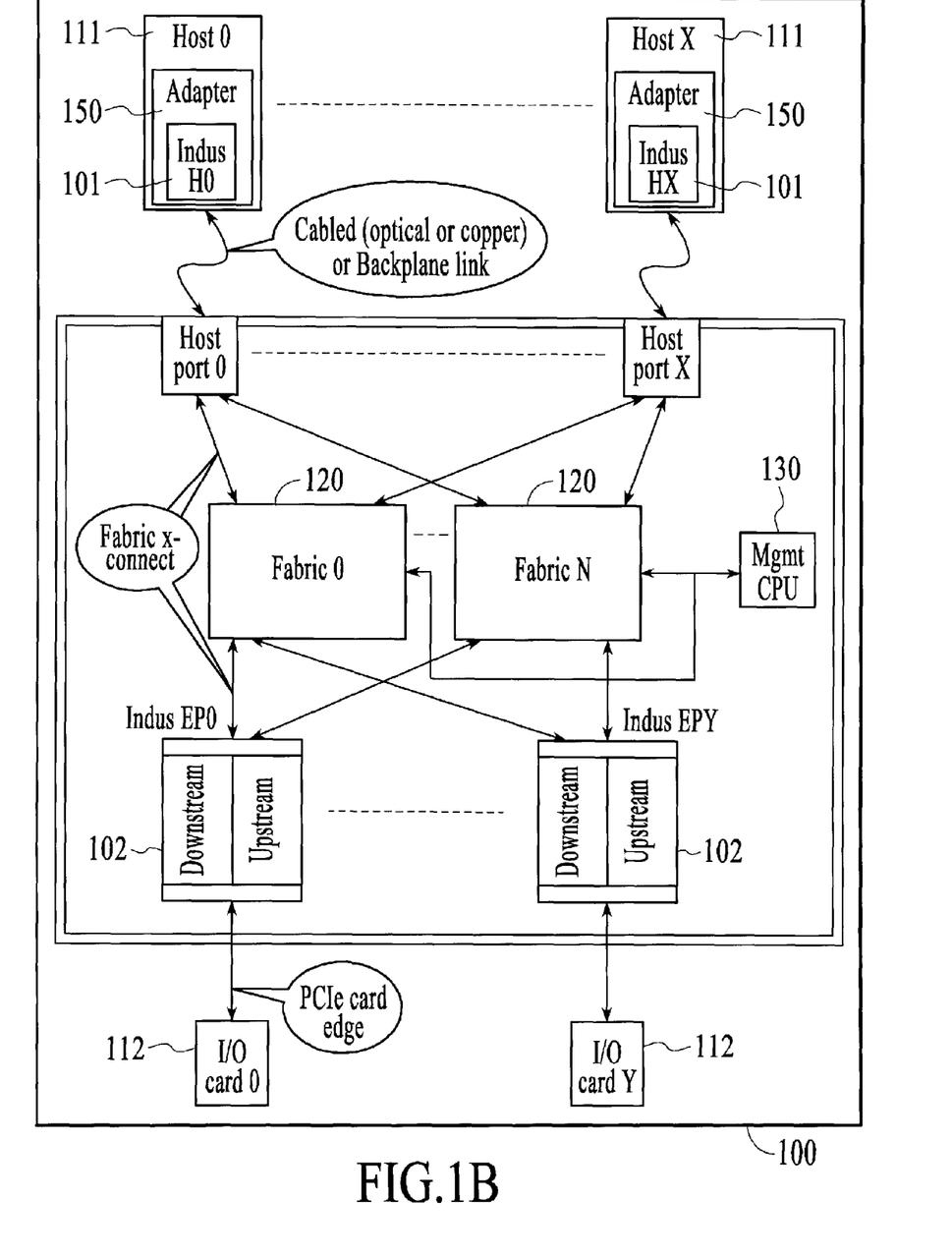
FIG. 1B is another block diagram of the IOV System, under an embodiment.

FIG. 1B is a block diagram of the Input/Output Virtualization (IOV) System 100, under a more specific embodiment. The IOV system 100 comprises a number of IOV interface devices 101-102. The IOV interface devices of an embodiment include host interface devices 101 coupled or connected to host computers 111, where at least one host interface device 101 is coupled or connected to at least one host computer 111 (e.g., Indus H0, Indus H1 . . . Indus HX is coupled or connected to Host 0, Host 1 . . . Host X, respectively (where X is any number)). The IOV interface devices of an embodiment include endpoint interface devices 102 coupled or connected to IO devices 112, where at least one endpoint interface device 102 is coupled or connected to at least one IO device 112 (e.g., Indus EP0, Indus EP1 . . . Indus EPY is coupled or connected to IO device 0, IO device 1 . . . IO device Y, respectively (where Y is any number)).

A transport fabric 120 provides a scalable, low-latency, high-bandwidth interconnection fabric for coupling or connecting the host computers 111, the IO devices 112, and the IOV interface devices 101-102 to the system. Various transport fabric technologies can be used for the transport fabric 120, including Ethernet, InfiniBand, and/or other proprietary fabric solutions to name a few. For ease of use, low cost, and compatibility purposes, the IOV system 100 of an embodiment uses low-latency Ethernet based devices to implement the transport fabric 120. A management CPU 130 of an embodiment couples or connects directly to the transport fabric 120 using a fabric-native interface, and IOV interface functionality between the transport fabric 120 and the management CPU 130 is implemented in software and/or other components of the management CPU 130 and/or the transport fabric 120.

The host interface devices 101 of an embodiment can be a component of an adapter 150, but are not so limited. The adapter 150, when present, may take the physical form of a PCIe card in rackmount servers or mezzanine card in blade servers. The adapter functionality may be further integrated onto a host motherboard. The host interface device 101 provides a standard PCIe interface to the host computer 111, and a multi-link interface to the transport fabric 120.

Figure 2:
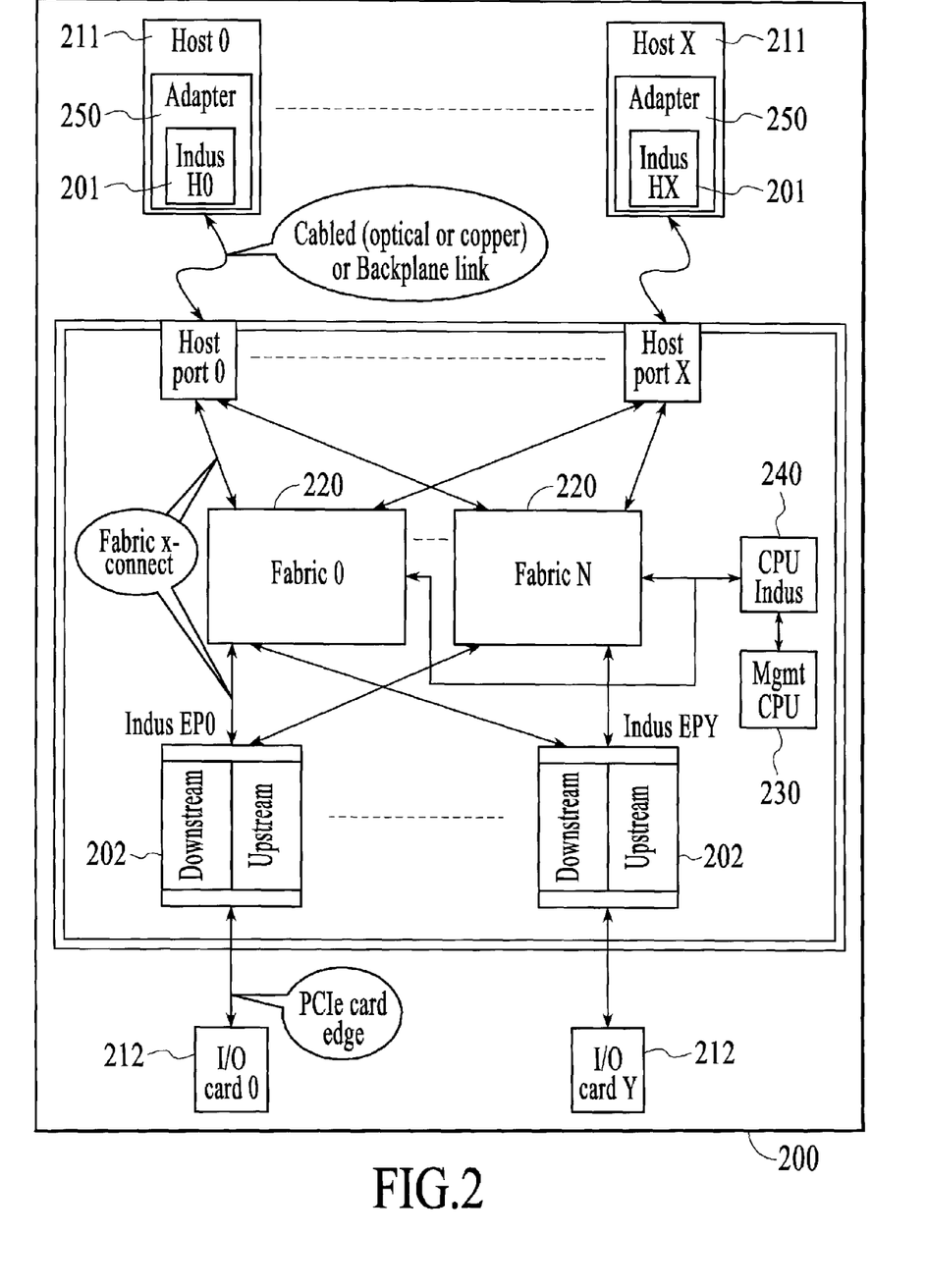
FIG. 2 is a block diagram of the IOV system, under an alternative embodiment.

FIG. 2 is a block diagram of the Input/Output Virtualization (IOV) System 200, under an alternative embodiment. The IOV system 200 comprises a number of IOV interface devices 201-202. The IOV interface devices of an embodiment include a management interface device 240 coupled or connected to a management CPU 230. The IOV interface devices of an embodiment also include host interface devices 201 coupled or connected to host computers 211, where at least one host interface device 201 is coupled or connected to at least one host computer 211 (e.g., Indus H0, Indus H1 . . . Indus HX is coupled or connected to Host 0, Host 1 . . . Host X, respectively (where X is any number)). Furthermore, the IOV interface devices of an embodiment include endpoint interface devices 202 coupled or connected to IO devices 212, where at least one endpoint interface device 202 is coupled or connected to at least one IO device 212 (e.g., Indus EP0, Indus EP1 . . . Indus EPY is coupled or connected to IO device 0, IO device 1 . . . IO device Y, respectively (where Y is any number)).

A transport fabric 220 provides a scalable, low-latency, high-bandwidth interconnection fabric for coupling or connecting the management CPU, the host computers 211, the IO devices 212, and the IOV interface devices 201-202 to the system. Various transport fabric technologies can be used for the transport fabric 220, including Ethernet, InfiniBand, and/or other proprietary fabric solutions to name a few. For ease of use, low cost, and compatibility purposes, the IOV system 200 of an embodiment uses low-latency Ethernet based devices to implement the transport fabric 220.

The host interface devices 201 of an embodiment can be a component of an adapter 250, but are not so limited. The adapter 250, when present, may take the physical form of a PCIe card in rack-mount servers or mezzanine card in blade servers. The adapter functionality may be further integrated onto a host motherboard. The host interface device 201 provides a standard PCIe interface to the host computer 211, and a multi-link interface to the transport fabric 220.

Generally, the host interface device exposes multiple independent PCI devices to the host computer. These PCI devices are exposed as a proxy device, or proxy, of a function within the host interface device. The PCI-Express proxy device is a device which is coupled between a host server's PCI-Express subsystem and a second PCI-Express subsystem (the shared subsystem). The shared subsystem is managed by a PCI-Express manager. The shared subsystem will comprise one or more endpoint devices which provide services such as communications interfaces or storage capacity. The proxy device may implement multiple functions, each of which can be a proxy representing a different endpoint function (EPF) in endpoint devices of the shared subsystem.

The PCI-Express proxy device exposes the functionality of an endpoint function to the host to which the proxy device is accessible. The proxy device appropriately translates all accesses intended for the endpoint into transactions that may be transferred across the switch fabric of the shared subsystem. In this way, the functionality of the endpoint is accessible to the host using standard and existing PCI-Express software.

The proxy provides access to the endpoint device by storing information to identify local and remote resources. As the proxy comprises a PCI function on the local host bus, the local information that it stores includes a PCI identifier in the domain of the local host. The PCI identifier of an embodiment is a bus/device/function (BDF) number. The BDF identifies either the requester or completer in the PCIe split-transaction protocol. The BDF is unique within a single domain, but if a resource is accessed from multiple domains, the BDF is modified so as not to allow duplicate identifiers.

Additionally, the proxy stores information to identify the remote endpoint function. This information includes an EPF identifier, which may be a PCI identifier (e.g., BDF) in the domain of the shared subsystem, or an identifier of a different format. The information to identify the remote EPF also includes the destination address of the device interface corresponding to the EPF, and the destination address of the manager. Furthermore, the information to identify the remote EPF includes resource identifiers such as a memory range identifier (indicating a specific PCI base address register (BAR) in the endpoint device), and a related mechanism to determine the identifier per transaction.

The proxy further handles routing of transactions between the host, the endpoint function, and the MCPU. Depending on the type of endpoint function and the type of transaction, the proxy determines the destination of requests from the host, the destination of requests being either the endpoint function or the MCPU, but the embodiment is not so limited.

In an embodiment, the proxy reserves local resources (e.g., BDF, memory range, I/O range, etc) in the host domain. In so doing, the proxy device provides a placeholder device to reserve resources in the host domain during PCI enumeration and discovery. These resources include a PCI identifier, and the PCI identifier of an embodiment is one or more of a BDF, a memory space reservation, an IO space reservation, an interrupt request identifier, and a PCI capability, to name a few examples. The resources reserved can be a superset of the resources required by any EPF used in the system or, alternatively, a subset of the resources required by any EPF used in the system. Upon assignment of an EPF to a proxy device, the host rescans the PCI-Express subsystem and discovers the EPF resource requests. The resources requested by the EPF fit within the space reserved by the proxy, which prevents extensive reallocation of resources by the host. When the EPF is unassigned from the host, the proxy may be re-programmed to the original state so that resources are reserved during subsequent bus scans.

When a function is assigned to a specific host computer, the proxy for that function is populated with configuration information for the actual function. Upon population of the proxy, the IOV system indicates a hot-plug event to the host computer. Upon recognizing the hot-plug event and discovering the function proxy, the host computer loads the appropriate driver for the function. Configuration accesses to the proxy can be directed to the MCPU which controls configuration of the function and updates the proxy with current configuration status. Depending on the type of endpoint device, the mode of operation of the endpoint device, and the type of transaction, configuration accesses to the proxy may be directed to the EPF itself. The IO accesses to the proxy are sent directly to the IO device via the transport fabric to maintain a low-latency, high-throughput interface.

The IOV host interface device may also include an actual PCIe device to provide a host-to-host communication function. This function allows hosts to communicate directly with other hosts via various methods. Methods may include a memory-oriented scheme and/or a standard sockets-oriented scheme. For example, the mechanism of an embodiment maps a region of IO memory in one host to the physical memory in another. Based on this mechanism, connection-oriented or connectionless communication channels may be implemented. The function includes a direct memory access (DMA) engine, to offload the communication load from host CPUs.

The IO devices or other endpoint devices interface to the IOV system via the standard PCIe interface. The PCIe interface couples or connects to an IOV endpoint interface device (e.g., Indus EPx). The endpoint interface device provides the encapsulation and/or decapsulation of PCIe traffic such that it may traverse the transport fabric between the IO devices, the management CPU and the host computers. The transport fabric coupling or connection generally comprises multiple links to provide high bandwidth.

The IO devices can include devices having any number of different capabilities, single-function devices, multi-function devices, and/or SR-IOV capable devices. SR-IOV indicates a standard developed by the PCI-SIG to allow multifunction devices to be shared amongst multiple guest operating systems on a single host, in a virtual machine monitor (VMM or hypervisor) environment. In the IOV system of an embodiment, single function devices may be assigned to a single host only, with privileged control allowed for that host. Multifunction devices may be shared across multiple hosts with separate physical functions controlled by drivers running on the hosts, while the management CPU may run a privileged driver for configuring the functions. SR-IOV devices may be shared across multiple hosts with the physical functions controlled by the privileged driver running on the management CPU, and the virtual functions assigned to various hosts and controlled by non-privileged drivers running on those hosts.

The transport fabric and IOV interface device logic provide a robust interconnect that guarantees the reliability and quality of service expected by standard PCIe devices. These guarantees include error-free, in-order, exactly-once delivery of packets under a relatively high system load with relatively low loss. To achieve this, the transport fabric interface logic closely emulates the functionality of the PCIe link layer. This emulation includes the error checking, ACK/NAK protocol, packet retransmission, quality of service (priority), and extends the link layer with congestion management capabilities.

The use of an Ethernet transport fabric in an embodiment allows for the attachment of many hosts and IO devices. Ethernet switches are denser (more ports) and higher bandwidth than PCIe switches. Therefore, the IOV system can support more ports, on the order of 24-64 ports. This port count can be maintained for even very high bandwidth ports, as described below.

The transport fabric of an embodiment provides high-bandwidth interfaces to host and device ports. PCIe interfaces have a wide range of possible bandwidths, with links comprising one or more lanes, and lanes operating at various speeds. The slowest PCIe link possible is a single lane operating at 2.5 Gb/s (PCIe 1.0×1), for a total link bandwidth of 2.5 Gb/s and a data throughput of 2.0 Gb/s (250 MB/s) after encoding overhead is removed. The fastest link currently available has sixteen lanes operating at 5.0 Gb/s (PCIe 2.0× 16), providing 80 Gb/s of link bandwidth and 64 Gb/s (8 GB/s) of data throughput. As a single fabric port may provide less bandwidth than required to support a fast PCIe link, the IOV interface devices provide the capability to distribute the load across multiple transport fabric links. In order to maintain the maximum port count available in the transport fabric (given by the number of ports on a single fabric switch), multiple fabric switches are used in parallel to support these multi-link interfaces. For example, while a single 24-port fabric switch with 10 Gb/s ports can support 24 10 Gb/s interfaces, a combination of two 24-port switches can support 24 20 Gb/s interfaces. Similarly, a combination of four 64-port switches can support 64 40 Gb/s interfaces. This concept is called 'striping' and, for PCIe fabrics of the IOV system, this concept has been applied to an ethernet fabric. The interfaces may be distributed between hosts, IO devices, and the MCPU.

To support the sharing of peripheral devices or resource devices across multiple domains of the IOV system, an embodiment uses proxy devices and a proxy configuration manager component. A controlling server may be coupled to a proxy device. In one embodiment, the proxy device has at least two ports: a first port that is coupled to the controlling server and a second port that is coupled to a PCIe fabric. The host port comprises a PCIe link that may be scalable and comprise one or more high-speed lanes in accordance with the PCI-Express physical specification. The controlling server accesses a function of the target endpoint device through the associated proxy device, which directs transactions to the target function. The configuration space of the proxy device may comprise the PCI configuration registers, power management capabilities, message signaled interrupt (MSI) and/or MSI-eXtended (MSI-X) capabilities, and PCIe extended capabilities. The proxy device may be capable of receiving interrupt transactions from a proxy interrupt conveyance mechanism and communicating the interrupt transactions to a controlling server over a PCIe link. Multiple proxy devices may expose multiple functions embedded within endpoint devices to the server side of the IOV system and instantiate them by proxy. Each of these functions can represent a different endpoint function in the shared subsystem.

More particularly, the IOV system uses the proxy device to allow resource assignment and unassignment, where the proxy is a placeholder in the host interface device, reserving resources (e.g., PCIe identifier, BDF and system memory, etc.) for use by I/O devices to be assigned to the host computer. During the use of the I/O devices by the host computer, the proxy can perform other actions.

Figure 3:
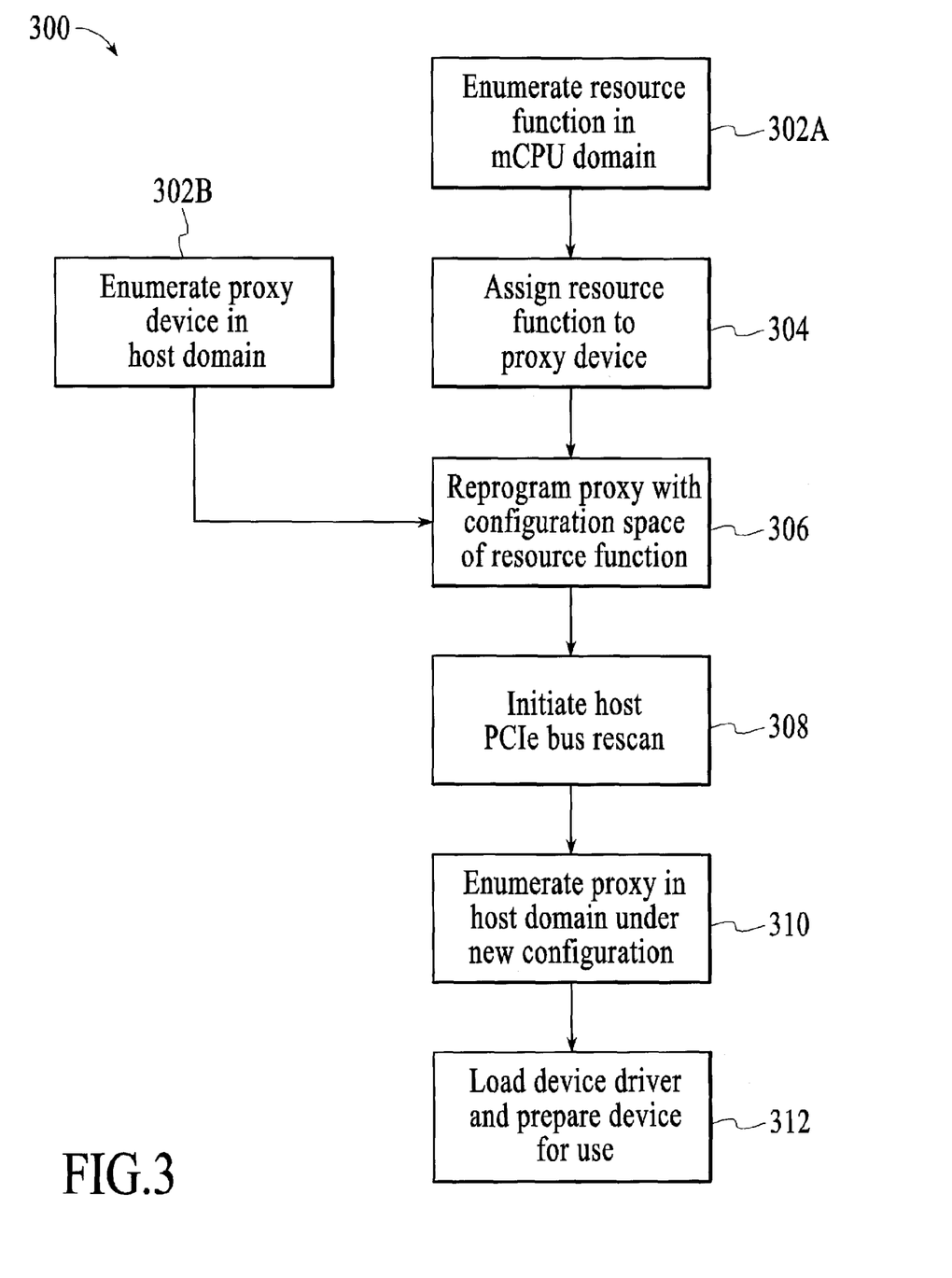
FIG. 3 is a flow diagram of I/O device assignment to a proxy device, under an embodiment.

FIG. 3 is a flow diagram of I/O device assignment to a proxy device 300 in the IOV system, under an embodiment. The I/O devices to be made available to host computers in the IOV system are discovered and enumerated in the MCPU domain 302A. Separately, the proxy devices in a host interface device are discovered by the host computer upon boot, and are thus enumerated as part of the host computer PCIe domain 302B. Once these tasks are completed, the system administrator assigns resource functions of the I/O devices to a host computer for use 304. The proxy device for the assigned resource function is populated with configuration information for the resource function by copying the configuration data for the target function into the proxy device of the host interface device of the host computer to which the corresponding resource functions are assigned 306. The IOV system indicates a hot-plug event to the host computer, and the IOV system initiates a rescan of the host computer system PCIe bus via the PCIe hot-plug event 308. Upon rescan, the host computer discovers and enumerates the assigned resource function remotely as directed by the configuration data. Upon recognition of the proxied function, the host computer loads the appropriate device driver for that resource function and prepares it for use in the host computer 312. Configuration accesses to the proxy are directed to the resource function or to the management CPU, depending on the type of access and the mode in which the device is operating.

Figure 4:
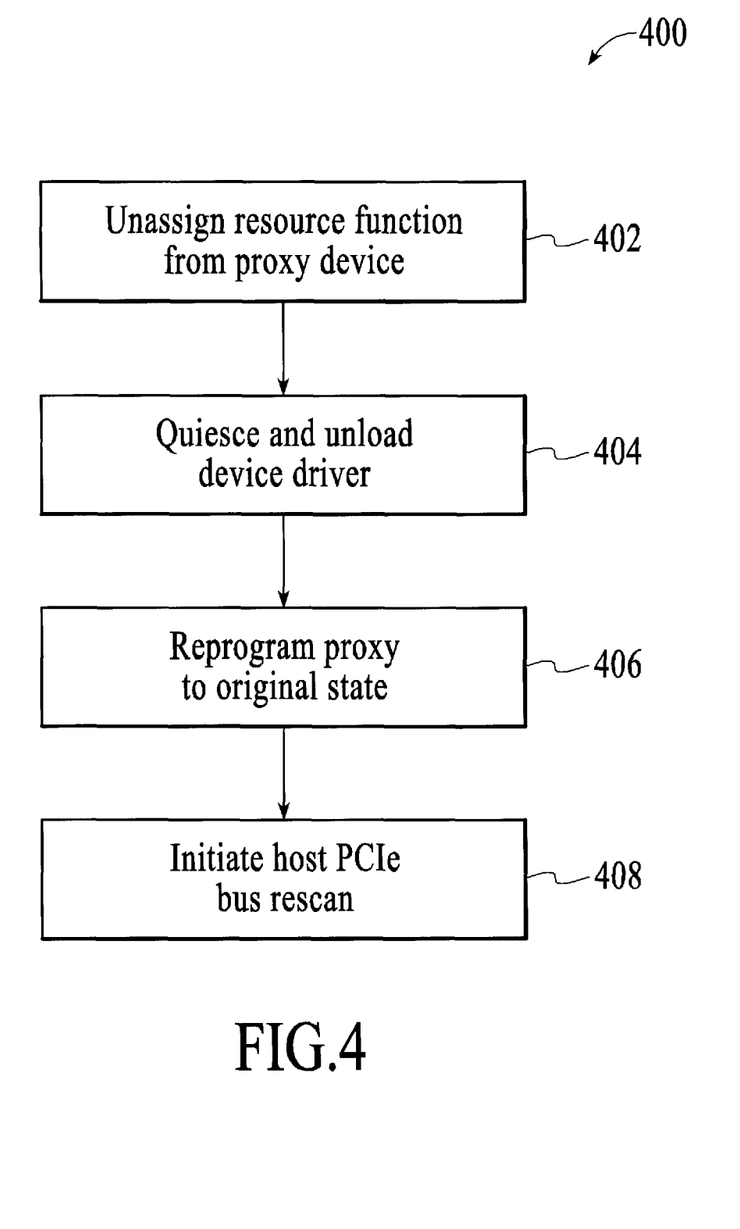
FIG. 4 is a flow diagram of I/O device unassignment from a proxy device, under an embodiment.

FIG. 4 is a flow diagram of I/O device unassignment from a proxy device 400 in the IOV system, under an embodiment. Upon I/O device un-assignment from a proxy device to which it was previously assigned, the system administrator unassigns a resource function of the I/O device from the proxy device 402. In response to the unassigning of the resource function, the host computer initiates the quiescence and unloading of the appropriate device driver for that resource function 404. The proxy is reprogrammed such that the proxy configuration is returned to its original state 406. The IOV system initiates a rescan of the host computer system PCIe bus via a PCIe hot-plug event 408.

In this fashion, PCIe resource functions of I/O devices in the system are exposed to host computers as separate PCIe devices. This enables the allocation of individual functions in a multifunction or SR-IOV resource card to be shared across multiple hosts where they appear as separate devices. This distinction further enables each I/O device to be managed separately in the separate host domains, with the management of the shared resource handled by the IOV system software.

The configuration of an embodiment further enables the sharing and flexible allocation of IO resources to host computers upon demand. The nature of the proxy and assignment method specifically enables the sharing of single-domain I/O devices across multiple domains, allow management of the I/O devices from a management domain, and allow host computers to use system resources without modification of the platform hardware, firmware, operating system, devices drivers, or applications.

To enable the transport of data between resource functions and hosts, each resource function and a representation of each function in the host interface is uniquely addressable over the transport fabric of an embodiment, as described in the Related Applications. Therefore, each interface device (host and resource) has a fabric address. The individual functions in a resource and each function representation (proxy) are disambiguated in a transport packet header field. Generally, then, functions of a target endpoint device are presented to a controlling server through an associated proxy device. Servers, proxy devices and endpoint devices use PCI Express transaction protocol to communicate. A proxy configuration manager copies the configuration space of a target endpoint device to a proxy device associated with a controlling server. Embodiments further provide a proxy interrupt conveyance mechanism that relays pending interrupts from endpoint devices in the shared subsystem to the appropriate controlling servers.

Figure 5:
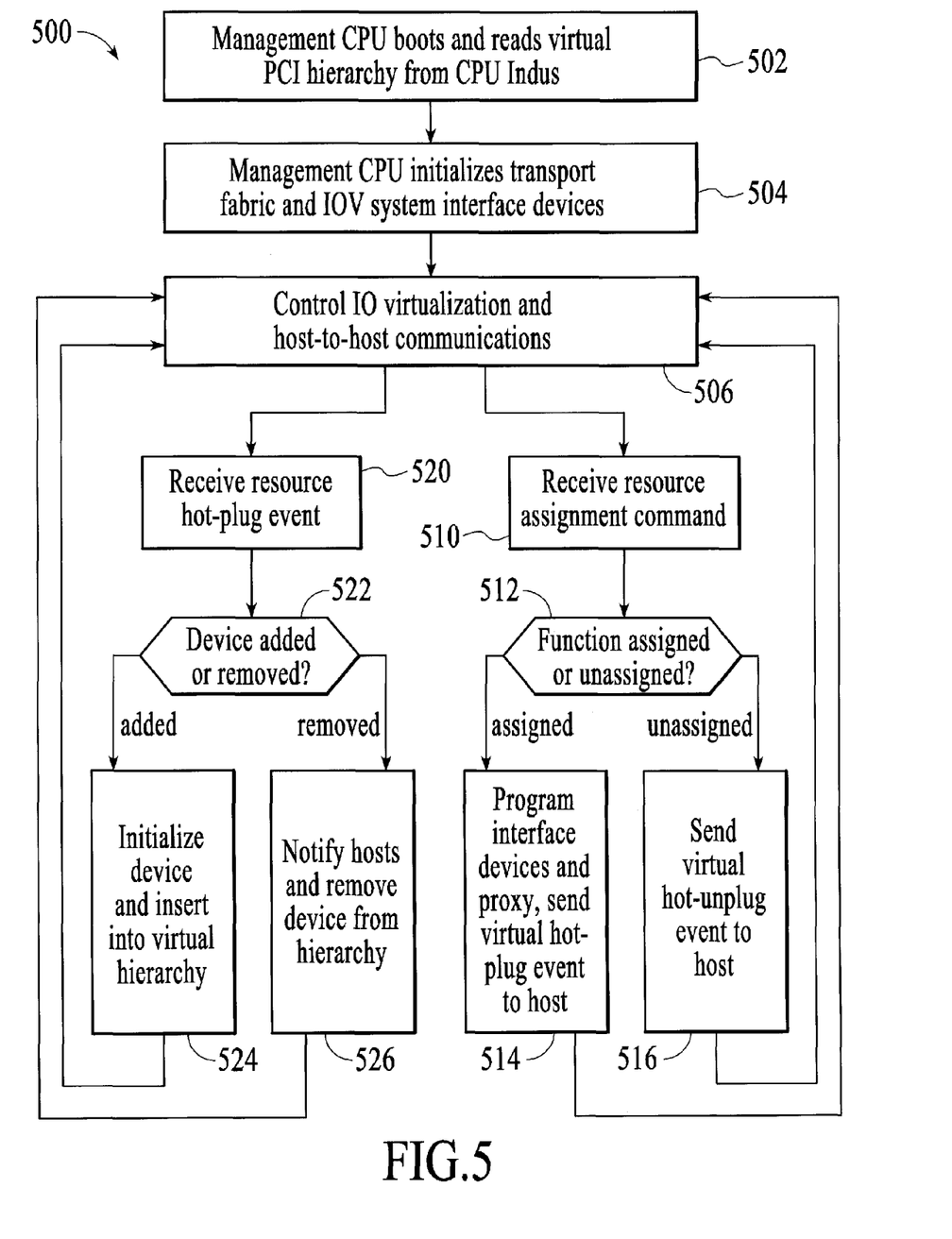
FIG. 5 is a flow diagram for controlling communications between host computers and I/O devices, under an embodiment.

FIG. 5 is a flow diagram for controlling communications between host computers and IO devices 500 in the IOV system, under an embodiment. Upon system startup, the management CPU boots 502 and loads a virtual PCIe hierarchy from the management interface device, then initializes 504 the transport fabric and IOV system interface devices coupled or connected to the system. The IOV interface devices provide an encapsulation and/or decapsulation protocol for PCIe traffic to traverse the transport fabric, as described above.

Using the transport fabric to access the IO devices, the management CPU then uses the standard PCIe discovery process to discover and enumerate all of the PCIe resources coupled or connected to the system. Generally, all resource discovery can be treated as hot-plug (e.g., at startup, devices already connected will send hot-plug events). When a resource is hot-plugged into the system, it is inserted into the virtual hierarchy and initialized. The management CPU initializes the PCIe devices, and runs a privileged driver for each to control the PCIe device. The privileged driver has complete control over the physical PCIe device, including power management and reset capability. The management CPU similarly discovers and controls PCIe devices that are hot-plugged to the system during live operation. The IOV system once initialized couples or connects multiple host computers and multiple IO devices to a managed transport fabric to provide and control 506 IO virtualization and host-to-host communication services to the host computers.

More specifically, communication control operations of an embodiment continue with the IOV system providing and controlling 506 IO virtualization and host-to-host communication services to the host computers using resource assignment commands and resource hot-plug events. In an embodiment, a resource assignment command is received 510, and a determination is made 512 whether the corresponding function is assigned or unassigned. When the function is assigned, associated interface devices and proxies are programmed and a virtual hot-plug event is sent 514 to the host. When the function is unassigned, a virtual hot-unplug event is sent 516 to the host.

Operation continues in an embodiment when a resource hot-plug event is received 520. In response, a determination is made 522 whether a device is being added or removed. When a device is being added, the device is initialized and inserted 524 into the virtual hierarchy. When a device is being removed, the host is notified and the device is removed 526 from the virtual hierarchy.

The IOV system of an embodiment allows for virtualization of multifunction (non-MR aware) PCIe devices across multiple hosts while utilizing the native device drivers. The IOV system further allows native host to host communications across the interconnect fabric, along with the IOV traffic. Additionally, the system provides native PCIe interfaces to hosts and IO devices in a scalable fashion (many high-bandwidth ports).

The IOV system implements a flexible and efficient architecture for datacenter computer interconnects. The IOV system architecture, for example, provides access to multiple IO resources over a single host connection which replaces multiple independent dedicated network connections. The convergence of these connections over a single 'wire' reduces costs and cabling complexity in the datacenter.

The ability to provision IO resources at a fine level of granularity using the IOV system gives users an efficient way to assign the resources that are necessary for a given compute job. Resources may be allocated according to service level agreements or allocated at the time of use. This prevents the need to install IO resources that may be underutilized by a given host.

The ability to centralize IO resources allows for efficient high-availability configurations. For example, if the host controlling a given resource fails, the resource can be reassigned to a working host and use of the resource can resume.

The IO address virtualization provided by the IOV system allows server hardware to be added or changed without affecting network configuration settings for access to other hosts, access to storage devices, and security. This simplifies network maintenance as servers are added, removed, or upgraded.

Conventional PCIe based systems are limited in scalability, and systems connected through standard PCIe switch silicon are severely limited in port count, limiting the number of hosts and IO devices that may be connected to the system. The IOV system provides a standard, scalable transport fabric and therefore a scalable and flexible interconnection topology for many hosts and IO devices. This also allows the IOV system of an embodiment to leverage existing standards-based devices and the original drivers provided by the device vendors.

The IOV system provides for a centralized entity to manage the assignment of IO functions to hosts and host-to-host communication channels. This capability allows datacenter managers to control the amount of IO allocated to individual hosts, ensuring that datacenter resources are available when desired and are used efficiently. The IOV system also provides a high-bandwidth, low-latency host-to-host communication capability. Providing this capability at the first tier (closest to the host) of interconnection is critical to achieving low latency and high throughput, while integration at this level reduces the cost of implementation.

The IOV system allows host (server) computers to be procured and installed without specific IO resources, and can access the necessary IO resources from the IOV network. Similarly, IO resources can be procured as necessary and installed in the system independently of computer resources (CPU and Memory). Thus, the upgrade cycles for compute and IO resources can be separated, reducing procurement cost and complexity.

Embodiments described herein include a system comprising a plurality of device interfaces coupled to transport fabric and to a plurality of input/output (IO) devices. Each IO device comprises at least one endpoint function (EPF). The system of an embodiment includes a plurality of host interfaces coupled to the transport fabric. Each host interface couples to a host computer of a plurality of independent host computers. The system of an embodiment includes a plurality of proxies. Each host interface comprises a proxy of the plurality of proxies. Each proxy includes configuration data.

Embodiments described herein include a system comprising: a plurality of device interfaces coupled to transport fabric and to a plurality of input/output (IO) devices, wherein each IO device comprises at least one endpoint function (EPF); and a plurality of host interfaces coupled to the transport fabric, wherein each host interface couples to a host computer of a plurality of independent host computers; a plurality of proxies, each host interface comprising a proxy of the plurality of proxies, each proxy including configuration data.

A plurality of EPFs of the plurality of independent IO devices of an embodiment are discovered and enumerated in a first domain.

At least one EPF of an embodiment is assigned to a proxy corresponding to a host computer.

A proxy of an embodiment in a host interface is discovered by a corresponding host computer corresponding to the host interface and is enumerated in a second domain that is an independent domain specific to the corresponding host computer.

The proxy of an embodiment is programmed with configuration data.

The configuration data of an embodiment comprises a bus-device-function (BDF) number in the first domain.

The configuration data of an embodiment comprises a memory range identifier.

The configuration data of an embodiment comprises an endpoint function (EPF) identifier of the EPF.

The configuration data of an embodiment comprises a destination address of a device interface corresponding to the EPF.

A bus of the host computer of an embodiment is rescanned.

The rescanning of an embodiment comprises a PCIe hot-plug event.

The EPF of an embodiment is discovered in the second domain via use of the configuration data.

A driver of an embodiment is loaded for the IO device comprising the EPF.

The EPF of an embodiment is unassigned from the proxy corresponding to the host computer.

The driver of an embodiment is unloaded for the IO device comprising the EPF.

The proxy of an embodiment is reprogrammed to an original state that is a state of the proxy prior to programming of the proxy with the configuration data.

The bus of the host computer of an embodiment is rescanned.

The rescanning of an embodiment comprises a PCIe hot-plug event.

The PCIe resource functions embodied in the EPFs of an embodiment are exposed to host computers as separate PCIe devices.

The plurality of independent IO devices of an embodiment include an IO device with one endpoint function (EPF), wherein the IO device with one EPF is assigned to a single host computer that has privileged control over the EPF.

The plurality of independent IO devices of an embodiment include an IO device with a plurality of endpoint functions (EPFs), wherein the IO device with the plurality of EPFs is shared across a set of host computers of the plurality of independent host computers.

The device interfaces and the host interfaces of an embodiment comprise at least one of an encapsulation protocol and a decapsulation protocol for Peripheral Component Interconnect Express (PCIe) traffic to traverse the transport fabric.

Embodiments described herein include a system comprising a management central processor unit (MCPU) coupled to transport fabric. The system of an embodiment comprises a plurality of device interfaces coupled to the transport fabric and to a plurality of input/output (IO) devices. Each IO device comprises at least one endpoint function (EPF). The system of an embodiment comprises a plurality of host interfaces coupled to the transport fabric. Each host interface couples to a host computer of a plurality of independent host computers. Each host interface comprises a proxy including configuration data.

Embodiments described herein include a system comprising: a management central processor unit (MCPU) coupled to transport fabric; a plurality of device interfaces coupled to the transport fabric and to a plurality of input/output (IO) devices, wherein each IO device comprises at least one endpoint function (EPF); and a plurality of host interfaces coupled to the transport fabric, wherein each host interface couples to a host computer of a plurality of independent host computers, each host interface comprising a proxy including configuration data.

A plurality of EPFs of the plurality of independent IO devices of an embodiment are discovered and enumerated in a first domain that is a domain of the MCPU.

The MCPU of an embodiment initializes the plurality of independent IO devices.

The MCPU of an embodiment runs a privileged driver for each IO device of the plurality of independent IO devices, wherein the privileged driver controls the IO device.

The system of an embodiment comprises assigning at least one EPF to a host computer for use by the host computer.

The system of an embodiment comprises assigning an EPF to a proxy, the proxy corresponding to the host computer.

A proxy in a host interface of an embodiment is discovered by a corresponding host computer corresponding to the host interface and is enumerated in a second domain that is an independent domain specific to the corresponding host computer.

The system of an embodiment comprises programming the proxy with configuration data.

The configuration data of an embodiment comprises a bus-device-function (BDF) number in the first domain.

The configuration data of an embodiment comprises a memory range identifier.

The configuration data of an embodiment comprises an endpoint function (EPF) identifier of the EPF.

The configuration data of an embodiment comprises a destination address of a device interface corresponding to the EPF.

The system of an embodiment comprises rescanning a bus of the host computer, wherein the bus is a Peripheral Component Interconnect Express (PCIe) bus.

The rescanning of an embodiment comprises a PCIe hot-plug event.

The system of an embodiment comprises discovering the EPF in the second domain via use of the configuration data.

The system of an embodiment comprises loading a driver for the IO device comprising the EPF and preparing the IO device for use.

Configuration accesses to the proxy of an embodiment are directed to the MCPU, wherein the MCPU controls configuration of the EPF and updates the proxy with current configuration status of the EPF.

The IO accesses to the proxy of an embodiment are sent directly to the IO device via the transport fabric.

The system of an embodiment comprises unassigning the EPF from the proxy, the proxy corresponding to the host computer.

The system of an embodiment comprises unloading the driver for the IO device comprising the EPF.

The system of an embodiment comprises reprogramming the proxy to an original state, wherein an original state is a state of the proxy prior to programming of the proxy with the configuration data.

The system of an embodiment comprises rescanning the bus of the host computer, wherein the bus is the PCIe bus.

The rescanning of an embodiment comprises a PCIe hot-plug event.

The PCIe resource functions embodied in the EPFs of an embodiment are exposed to host computers as separate PCIe devices.

The plurality of independent IO devices of an embodiment include an IO device with one endpoint function (EPF), wherein the MCPU assigns the IO device with one EPF to a single host computer, wherein the single host computer has privileged control over the EPF.

The plurality of independent IO devices of an embodiment include an IO device with a plurality of endpoint functions (EPFs), wherein the IO device with the plurality of EPFs is shared across a set of host computers of the plurality of independent host computers.

The plurality of IO devices of an embodiment are coupled to the transport fabric using a Peripheral Component Interconnect Express (PCIe) interface.

The MCPU of an embodiment is at least one of connected directly to the transport fabric and coupled to the transport fabric with a management interface.

The MCPU of an embodiment initializes the transport fabric, the device interfaces, and the host interfaces.

The MCPU of an embodiment initializes the device interfaces and the host interfaces.

The device interfaces and the host interfaces of an embodiment comprise at least one of an encapsulation protocol and a decapsulation protocol for Peripheral Component Interconnect Express (PCIe) traffic to traverse the transport fabric.

Embodiments described herein include a method comprising coupling a plurality of device interfaces to a transport fabric and to a plurality of input/output (IO) devices. Each device interface couples to the IO device of the plurality of IO devices. Each IO device comprises at least one endpoint function (EPF). The method of an embodiment comprises coupling a plurality of host interfaces to the transport fabric. Each host interface comprises a proxy and couples to a host computer of a plurality of independent host computers. The method of an embodiment comprises configuring each proxy with configuration data, wherein the proxy reserves resources for use by the corresponding host computer.

Embodiments described herein include a method comprising: coupling a plurality of device interfaces to a transport fabric and to a plurality of input/output (IO) devices, wherein each device interface couples to the IO device of the plurality of IO devices, wherein each IO device comprises at least one endpoint function (EPF); and coupling a plurality of host interfaces to the transport fabric, wherein each host interface comprises a proxy and couples to a host computer of a plurality of independent host computers; and configuring each proxy with configuration data, wherein the proxy reserves resources for use by the corresponding host computer.

The method of an embodiment comprises discovering and enumerating a plurality of EPFs of the plurality of independent IO devices in a first domain that is a domain of the MCPU.

The method of an embodiment comprises assigning at least one EPF to a host computer for use by the host computer.

The method of an embodiment comprises assigning an EPF to a proxy, the proxy corresponding to the host computer.

The method of an embodiment comprises discovering a proxy in a host interface and enumerating the proxy in a second domain that is an independent domain specific to the host computer corresponding to the proxy.

The method of an embodiment comprises reprogramming the proxy with configuration data.

The configuration data of an embodiment comprises a bus-device-function (BDF) number in the first domain.

The configuration data of an embodiment comprises a memory range identifier.

The configuration data of an embodiment comprises an endpoint function (EPF) identifier of the EPF.

The configuration data of an embodiment comprises a destination address of a device interface corresponding to the EPF.

The method of an embodiment comprises rescanning a bus of the host computer, wherein the bus is a Peripheral Component Interconnect Express (PCIe) bus.

The rescanning of an embodiment comprises a PCIe hot-plug event.

The method of an embodiment comprises discovering the EPF in the second domain via use of the configuration data.

The method of an embodiment comprises loading a driver for the IO device comprising the EPF and preparing the IO device for use.

The method of an embodiment comprises unassigning the EPF from the proxy.

The method of an embodiment comprises unloading the driver for the IO device comprising the EPF.

The method of an embodiment comprises reprogramming the proxy to an original state that is a state of the proxy prior to programming of the proxy with the configuration data.

The method of an embodiment comprises rescanning the bus of the host computer.

The rescanning of an embodiment comprises a PCIe hot-plug event.

Resource functions embodied in the EPFs of an embodiment are exposed to host computers as separate devices.

Networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof. Storage resources accessed by the system comprise storage networks (e.g., SAN, NAS, etc.), direct attached disks (e.g., DAS), and can also include removable media (e.g., CD, DVD, Tape, Flash, etc).

The IOV system can be a component of a single system, multiple systems, and/or geographically separate systems. The IOV system can also be a subcomponent or subsystem of a single system, multiple systems, and/or geographically separate systems. The IOV system can be coupled to one or more other components (not shown) of a host system or a system coupled to the host system.

One or more components of the IOV system and/or a corresponding system or application to which the IOV system is coupled or connected include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the IOV system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANS), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the IOV system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IOV system and corresponding systems and methods include: microcontrollers with memory (such as electronically erasable programmable read only memory (EEPROM)), embedded microprocessors, firmware, software, etc. Furthermore, aspects of the IOV system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the IOV system and corresponding systems and methods is not intended to be exhaustive or to limit the systems and methods to the precise forms disclosed. While specific embodiments of, and examples for, the IOV system and corresponding systems and methods are described herein for illustrative purposes, various equivalent modifications are possible within the scope of the systems and methods, as those skilled in the relevant art will recognize. The teachings of the IOV system and corresponding systems and methods provided herein can be applied to other systems and methods, not only for the systems and methods described above.

The elements and acts of the various embodiments described above can be combined to provide further embodiments. These and other changes can be made to the IOV system and corresponding systems and methods in light of the above detailed description.

In general, in the following claims, the terms used should not be construed to limit the IOV system and corresponding systems and methods to the specific embodiments disclosed in the specification and the claims, but should be construed to include all systems that operate under the claims. Accordingly, the IOV system and corresponding systems and methods is not limited by the disclosure, but instead the scope is to be determined entirely by the claims.

While certain aspects of the IOV system and corresponding systems and methods are presented below in certain claim forms, the inventors contemplate the various aspects of the IOV system and corresponding systems and methods in any number of claim forms. Accordingly, the inventors reserve the right to add additional claims after filing the application to pursue such additional claim forms for other aspects of the IOV system and corresponding systems and methods.

What is claimed is:

1. A system, comprising:
a plurality of device interfaces configured to couple to a transport fabric and to a plurality of input/output (IO) devices, wherein each IO device comprises at least one endpoint function (EPF); and
a plurality of host interfaces configured to couple to the transport fabric and to a respective one of a plurality of independent host computers, wherein each host interface includes a device proxy configured to:
reserve resources of a host computer prior to assignment of an EPF corresponding to one of the plurality of IO devices, wherein the resources are usable by the EPF; and
expose the EPF to the host computer responsive to the EPF being assigned.

2. The system of claim 1, wherein the system is configured to:
discover and enumerate a device proxy in a first domain of a host computer;
discover and enumerate an EPF assigned to the device proxy in a second domain, distinct from the first domain.

3. The system of claim 2, wherein the first and second domains are Peripheral Component Interconnect Express (PCIe) domains.

4. The system of claim 2, wherein the device proxy is configured store configuration data of the EPF responsive to an assignment of the EPF.

5. The system of claim 4, wherein the configuration data comprises a bus-device-function (BDF) number in the second domain.

6. The system of claim 4, wherein the configuration data comprises a memory range identifier.

7. The system of claim 4, wherein the configuration data comprises an endpoint function (EPF) identifier of the EPF.

8. The system of claim 4, wherein the configuration data comprises a destination address of a device interface corresponding to the EPF.

9. The system of claim 4, wherein the corresponding host computer is configured to rescan a bus coupled to the device proxy.

10. The system of claim 9, wherein the rescan occurs in response to a PCIe hot-plug event.

11. The system of claim 9, wherein the EPF is discoverable in the first domain via use of the configuration data.

12. The system of claim 1, wherein the device proxies are reprogrammable to an original state that is a state of the device proxy prior to programming of the device proxy with the configuration data.

13. The system of claim 1, wherein the device proxies are configured to expose PCIe resource functions embodied in the EPFs as separate PCIe devices.

14. The system of claim 1, wherein the plurality of IO devices include an IO device with one endpoint function (EPF), wherein the IO device with one EPF is assigned to a single host computer that has privileged control over the EPF.

15. The system of claim 1, wherein the plurality of IO devices include an IO device with a plurality of endpoint functions (EPFs), wherein the IO device with the plurality of EPFs is shared across ones of the plurality of independent host computers.

16. The system of claim 1, wherein the device interfaces and the host interfaces are configured to communicate via packets that encapsulate Peripheral Component Interconnect Express (PCIe) traffic to traverse the transport fabric.

17. A host computer, comprising:
a host interface configured to couple the host computer to a transport fabric usable to communicate with a plurality of input/output (IO) devices, wherein each IO device includes at least one endpoint function (EPF);
wherein the host interface implements a device proxy configured to:
reserve resources of the host computer prior to assignment of an EPF corresponding to one of the plurality of IO devices, wherein the resources are usable by the EPF; and
expose the EPF to the host computer responsive to the EPF being assigned.

18. The host computer of claim 17, wherein the host computer is configured to enumerate the device proxy in a Peripheral Component Interconnect Express (PCIe) domain of the host computer; and
wherein the device proxy is configured to expose an EPF enumerated in a PCIe domain distinct from the PCIe domain of the host computer.

19. The host computer of claim 17, wherein the device proxy is configured to:
responsive to an assignment of the EPF:
store configuration information of the EPF, wherein the configuration information is usable to enumerate the EPF; and
indicate a hot-plug event to the host computer to cause the host computer to rescan a bus of the host computer and enumerate the EPF.

20. The host computer of claim 19, wherein the configuration information includes a bus-device-function (BDF) number and an endpoint function (EPF) identifier of the EPF.

21. The host computer of claim 19, wherein the host computer is configured to load a driver for the EPF responsive to indication of the hot-plug event.

22. The host computer of claim 17, wherein the host interface is configured to:
encapsulate Peripheral Component Interconnect Express (PCIe) traffic associated with the EPF within one or more packets;
communicate the one or more packets over the transport fabric.

23. The host computer of claim 17, wherein the host interface is configured to share the IO device with one or more other host computers.

24. The host computer of claim 17, wherein the device proxy is configured to expose an EPF assigned by a management central processor unit (MCPU) coupled to the transport fabric.

* * * * *